United States Patent
Short

(10) Patent No.: US 8,420,942 B2
(45) Date of Patent: Apr. 16, 2013

(54) DEVICE FOR CABLE MANAGEMENT

(75) Inventor: Mark Short, Kingswinford (GB)

(73) Assignee: AVF Group Ltd. (GB)

( * ) Notice: Subject to any disclaimer, the term of this patent is extended or adjusted under 35 U.S.C. 154(b) by 281 days.

(21) Appl. No.: 12/843,666

(22) Filed: Jul. 26, 2010

(65) Prior Publication Data

US 2011/0100678 A1    May 5, 2011

(30) Foreign Application Priority Data

Nov. 2, 2009 (GB) .................................. 0919195.8

(51) Int. Cl.
*H01B 7/00* (2006.01)
(52) U.S. Cl.
USPC .............. 174/135; 174/95; 174/97; 174/68.1; 174/480; 439/207; 52/220.1
(58) Field of Classification Search .................. 174/135, 174/95, 97, 68.1, 68.3, 480; 439/207; 52/220.1
See application file for complete search history.

(56) References Cited

U.S. PATENT DOCUMENTS

| 5,435,606 | A  | * | 7/1995  | Navazo ....................... 285/149.1 |
| 5,732,747 | A  | * | 3/1998  | Holliday ........................ 138/163 |
| 6,972,367 | B2 | * | 12/2005 | Federspiel et al. ............ 174/481 |
| 7,041,898 | B2 | * | 5/2006  | Stempinski et al. .......... 174/488 |

FOREIGN PATENT DOCUMENTS

| DE | 10207827 A1 | 2/2002 |
| EP | 0027814 | 4/1984 |
| EP | 1723707 B1 | 7/2008 |
| GB | 2205005 | 4/1991 |
| GB | 2241385 | 8/1991 |
| WO | WO80/02476 | 11/1980 |
| WO | WO2005/086304 | 9/2005 |

OTHER PUBLICATIONS

Video placed on You Tube by the Assignee "The AVF Group" and a screen grab showing the video available on You Tube; Declaration Under 37 CFR 1.132.

* cited by examiner

*Primary Examiner* — Dhirubhai R Patel
(74) *Attorney, Agent, or Firm* — Berliner & Associates

(57) ABSTRACT

A device for cable management having a first component and a second component. Each of the first and second components have a generally flat elongate sheet having longitudinal parallel edges which provide complementary inter-engaging of the first and second components. The width of the second component is greater than that of the first component such that when the edges of the second component are engaged with those of the first component, the second component adopts a curved profile.

17 Claims, 2 Drawing Sheets

DEVICE FOR CABLE MANAGEMENT

CROSS REFERENCE TO RELATED APPLICATIONS

Not applicable

STATEMENT REGARDING FEDERALLY SPONSORED RESEARCH OR DEVELOPMENT

Not applicable

FIELD OF INVENTION

The present invention relates to a device for cable management. In particular, it relates to a device for tidying and hiding electric cables from view.

BACKGROUND OF THE INVENTION

With a growing number of electronic devices being used in homes and offices there is a growing need for managing the power cables and connecting wires both between the various devices and to and from power sockets. Without such cable management the cables become tangled and form an unsightly mess. In addition, cables that are not neatly stored can constitute a health and safety hazard causing passers by to trip or otherwise become tangled therein.

A variety of cable management devices are available to try to address these issues. Such devices are also commonly referred to as cable trunking. In general, cable trunking is provided in the form an elongate enclosure through which cables are passed in order to keep them neatly out of sight. Often the device is configured for attachment to a wall or similar surface to keep it out of the way. A variety of end caps, corner joints and linking sections are also typically provided to join lengths of cable trunking together.

A common cable management device comprises a flat base with fixed, upstanding, inwardly curving sidewalls. A moulded part-circular (inwardly curving) lid is permanently connected along one side wall by a strip of thinned material. The opposite side wall is provided with a channel into which the free end of the lid can be snap-fitted to complete the enclosure. As the lid on this device only has to be fitted along one side it is easy and quick to assemble. As the device has a semi-circular cross-section it requires less raw material (and is therefore more economical) than typical rectangular cable management devices the above and is generally considered to be aesthetically pleasing. However, the main disadvantage of this type of device is that, due to the rigid structure of the base, side walls and curved lid, and due to the fact that it is supplied as a single piece, it is not possible to roll this product into a compact form for supply, transport and storage purposes. Accordingly, this product is sold in an assortment of fixed lengths and so extra effort is generally required in order to create the desired length of cable trunking and waste is produced where lengths are required to be cut to the desired size.

The object of the present invention is to provide an improved cable management device which mitigates some of the problems described above.

BRIEF SUMMARY OF THE INVENTION

According to a first aspect of the present invention there is provided a device for cable management comprising a first component and a second component, each of said first and second components comprising a generally flat elongate sheet having longitudinal parallel edges which provide complementary inter-engaging means for engagement of said first and second components, wherein the width of said second component is greater than that of said first component such that when the edges of said second component are engaged with those of said first component, the second component adopts a curved profile.

It will be understood that, because the width of the second component is greater than that of the first component, the second component must bend in order to effectively shorten its width to allow the edges of the second component to engage with those of the first component. Thus when the first and second components are engaged the second component curves outwardly of the first component to create a space therebetween in which cables and/or wires can be positioned.

The edges of the first and second components may engage via any suitable complementary inter-engaging means. In an embodiment, the edges of the first component form inwardly facing recesses and the edges of the second component form complementary outwardly facing projections such that, in use, the outwardly facing projections on the second component are received within the inwardly facing recesses on the first component.

In this embodiment, a force is generated by the second component trying to restore itself back to a generally flat state and it is this force that serves to hold the second component within the recesses of the first component. The first component is designed to resist deformation caused by the forces applied to it by the second component, so that the first component remains substantially flat when the second component is engaged therewith.

Alternatively, the complementary inter-engaging means may comprise a snap-fit connection.

In an embodiment, the first and second components are formed of a flexible material.

Conveniently, one or both of the first and second components can be provided in the form of a roll. This can allow long lengths of each component to be supplied in a small container. The first and second components may be formed from a generally thin material which can be easily cut (for example, with scissors) to the desired length. Cut-outs may also be included in the first and/or second components to provide access to the cables and/or wires concealed therebetween.

In a preferred embodiment, the first and second components are made of a plastics material.

In an embodiment, the first component is provided with attachment means by which it can be fixed to a surface, such as a wall. In a particular embodiment, a rear surface of the first component, which faces away from the second component when in use, is provided with one or more adhesive strips by which it can be fixed to a surface.

According to a second aspect of the present invention there is provided a device for cable management comprising a first component comprising a generally flat elongate sheet having longitudinal parallel edges which form inwardly facing recesses and a second component comprising a generally flat elongate sheet having longitudinal parallel edges which form outwardly facing projections, wherein the width of the second component is greater than that of the first component such that when the outwardly facing projections of the second component are received within the inwardly facing recesses of the first component, the second component is subject to a restorative force which serves to hold the first and second components together.

It will be understood that the optional features described above in respect of the first aspect of the invention apply equally to the second aspect of the invention, where compatible therewith.

According to a third aspect of the present invention there is provided a method of manufacturing a device for cable management, comprising the steps of:

Forming a first component comprising a generally flat elongate sheet having longitudinal parallel edges, Forming a second component comprising a generally flat elongate sheet having longitudinal parallel edges, wherein the width of the second component is greater than that of the first component, and Forming the edges of the first and second components into complementary inter-engaging means configured such that when the edges of said second component are engaged with those of said first component, the second component adopts a curved profile.

In an embodiment, the method further comprises the steps of winding long lengths of each of the first and second components into rolls, and packaging the rolls for transport, storage and/or sale. The first and second components may be sold separately, or they may be sold together in a single package. The first and second components may be sold in predetermined lengths. Alternatively, lengths of the first and second components may be dispensed from rolls according to each customer's requirements.

In a further embodiment, the method further comprises the step of providing the first component with attachment means by which it can be secured to a surface. In a particular embodiment, the attachment means may be constituted by one or more adhesive strips.

According to a fourth aspect of the present invention there is provided a method of assembly of a device according to the first aspect of the invention, comprising the steps of;

Fixing the first component to a surface and

Attaching the second component to the first component via the complementary inter-engaging means provided on the first and second components.

Prior to fixing the first component to a surface, the method may also comprise the steps of unwinding rolls of the first and second components. The method may further comprise the step of cutting the first and second components to the desired length.

BRIEF DESCRIPTION OF THE DRAWINGS

An embodiment of the invention will now be described with reference to the accompanying figures, in which.

DETAILED DESCRIPTION OF THE INVENTION

Figure 1:
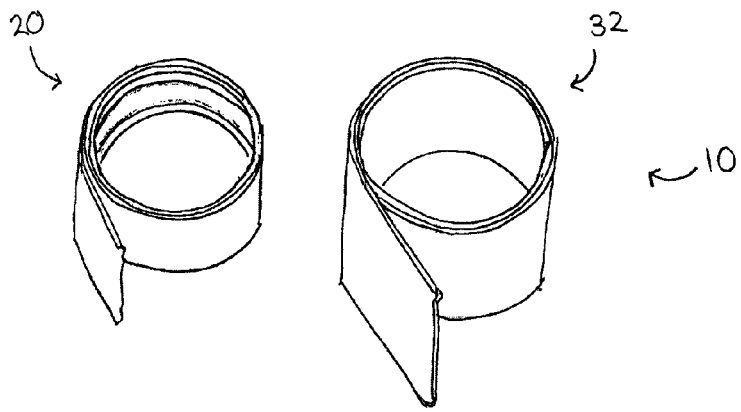
FIG. 1 shows the rolled-up components of the device prior to assembly, in accordance with an embodiment of the present invention.
Figure 2:
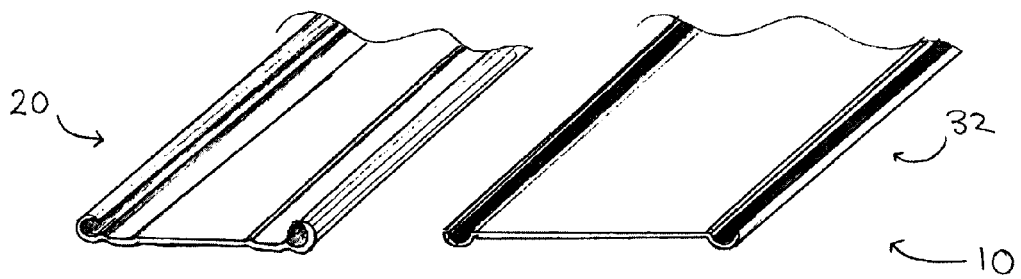
FIG. 2 shows a perspective view of the un-rolled flat components of the device of FIG. 1, pre-assembly.
Figure 3:
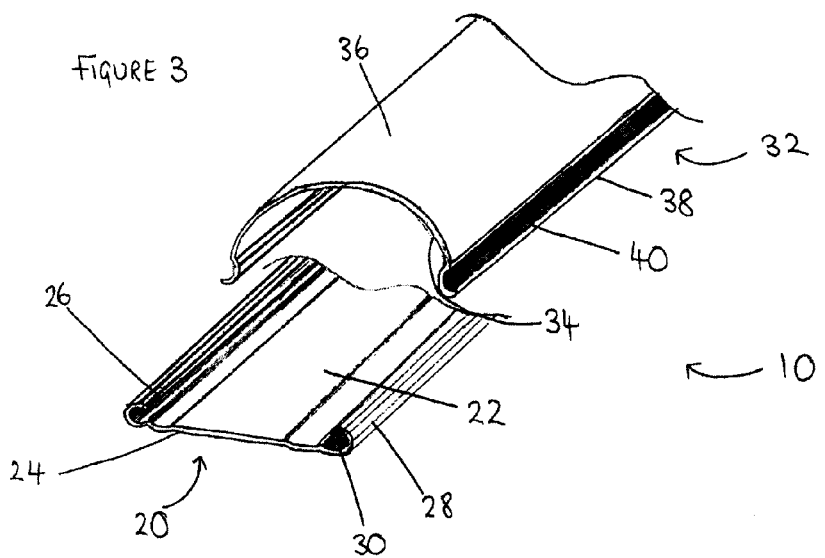
FIG. 3 shows a further perspective view of the components of the device of FIG. 1, manipulated ready for assembly.

FIGS. 1 to 3 show a device 10 according to an embodiment of the present invention. The device 10 comprises two generally flat elongate components referred to as a first component 20 and a second component 32. The first and second components 20, 32 are made of thin, flexible plastic and can be supplied rolled up along their length (FIG. 1). Prior to assembly, each component is unrolled and cut to the desired length. Ideally the second component 32 is cut to the same length as the first component 20.

The first component 20, when unrolled, provides a substantially flat elongate base for the device 10, as shown in FIGS. 2 and 3. The first component 20 has a front surface 22, a rear surface 24 and longitudinal parallel edges 26. Each longitudinal parallel edge 26 of the first component 20 curls upwardly and inwardly towards the centre of the upper surface 22 to form a lip 28 which encloses an inwardly facing recess 30.

The second component 32 of the device 10 has an inner surface 34, an outer surface 36 and longitudinal parallel edges 38. The second component 32 is substantially flat when unrolled and prior to assembly of the device 10. The second component 32 provides a cover which attaches to the base provided by the first component 20. The longitudinal parallel edges 38 of the second component 32 are bent such that they project substantially perpendicularly to the outer surface 36 to provide outwardly facing projections 40.

Figure 4:
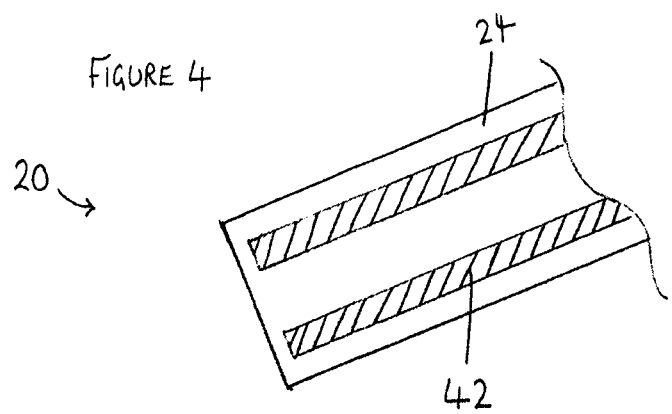
FIG. 4 shows a rear plan view of the first component of the device of FIG. 1.
Figure 5:
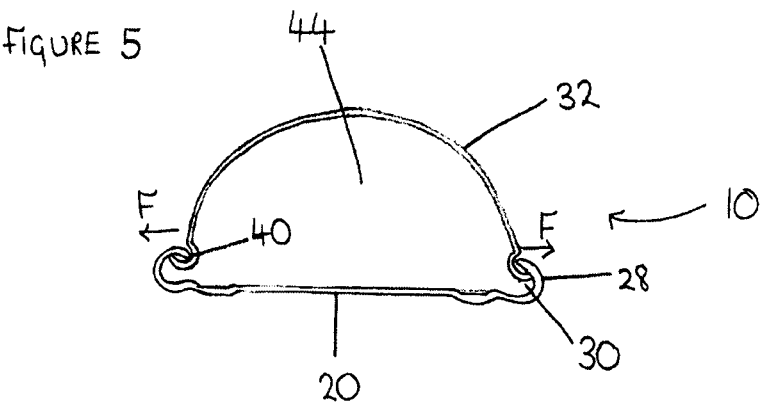
FIG. 5 shows an end view of the assembled device of FIG. 1.

FIG. 4 shows the rear surface 24 of a section of the first component 20. The rear surface 24 is provided with two longitudinal adhesive strips 42, which are used to fix the first component 20 to a surface such as a wall.

FIG. 3 shows the device 10 in the assembled state. When assembled, the outwardly facing projections 40 formed by the edges 38 of the second component 32 are accepted within the inwardly facing recesses 30 formed by the edges 26 of the first component 20. Because the second component 32 is wider than the first component 20, in order for the projections 40 to mate with the recesses 30, a curve must be introduced into the second component 32 to effectively shorten the width between its edges 34. The second component 32 therefore curves away from the first component 20, thus creating a void 44 in which cables or wires can be positioned. As the second component 32 is flexed against its natural state, an outward (restorative) force is applied to both the first and second components 20, 32, as indicated by arrows labelled F. This outward force retains the first and second components 20, 32 together in their relative positions.

It will be understood by persons skilled in the art that various modifications may be made to the described embodiment without departing from the scope of the invention, as defined in the accompanying claims.

The invention claimed is:

1. A device for cable management comprising a first component and a second component, each of said first and second components comprising a generally flat elongate sheet formed of a flexible material having longitudinal parallel edges, wherein the edges of the first component form inwardly facing recesses and the edges of the second component form complementary outwardly facing projections such that, in use, the outwardly facing projections on the second component are received within the inwardly facing recesses on the first component, and wherein a width of said second component is greater than that of said first component such that when the edges of said second component are engaged with the edges of said first component, the second component changes from a flat to a curved profile.

2. The device according to claim 1 wherein a force is generated by the second component trying to restore itself back to a generally flat state and it is this force that serves to hold the second component within the recesses of the first component.

3. The device according to claim 1 wherein the first component is designed to resist deformation caused by forces applied to it by the second component, so that the first component remains substantially flat when the second component is engaged therewith.

4. The device according to claim 1 wherein one or both of the first and second components are provided in the form of a roll.

5. The device according to claim 1 wherein the first and second components are formed from a generally thin material which can be easily cut to a desired length.

6. The device according to claim 1 wherein cut-outs are included in the first and/or second components to provide access to the cables and/or wires concealed therebetween.

7. The device according to claim 1 wherein the first and second components are made of a plastics material.

8. The device according to claim 1 wherein the first component is provided with attachment means by which it can be fixed to a surface, such as a wall.

9. The device according to claim 8 wherein a rear surface of the first component, which faces away from the second component when in use, is provided with one or more adhesive strips by which it can be fixed to a surface.

10. A method of assembly of a device according to claim 1, comprising the steps of:
    fixing the first component to a surface; and
    attaching the second component to the first component such that the outwardly facing projections on the second component are received within the inwardly facing recesses on the first component.

11. The method of claim 10 further comprising the step of unwinding rolls of the first and/or second components, prior to fixing the first component to a surface and attaching the second component to the first component.

12. The method of claim 10 further comprising the step of cutting the first and/or second components to a desired length.

13. A method of manufacturing a device for cable management, comprising the steps of:
    forming a first component comprising a generally flat elongate sheet of a flexible material having longitudinal parallel edges,
    forming a second component comprising a generally flat elongate sheet of a flexible material having longitudinal parallel edges, wherein a width of the second component is greater than that of the first component, and
    forming the edges of the first component into inwardly facing recesses and the edges of the second component into complementary outwardly facing projections such that, in use, the outwardly facing projections on the second component are received within the inwardly facing recesses on the first component and when the edges of said second component are engaged with the edges of said first component, the second component changes from a flat to a curved profile.

14. The method according to claim 13 further comprising the steps of winding long lengths of each of the first and second components into rolls, and packaging the rolls.

15. The method according to claim 14 wherein the rolls of the first and second components are packaged together.

16. The method according to claim 13 further comprising the step of providing the first component with attachment means by which it can be secured to a surface.

17. The method according to claim 16 wherein the attachment means is constituted by one or more adhesive strips.

* * * * *